United States Patent [19]

Min

[11] Patent Number: 5,473,481

[45] Date of Patent: Dec. 5, 1995

[54] CAPTION SIGNAL RECORDING AND REPRODUCING CONTROL DEVICE IN VIDEO CASSETTE RECORDERS

[75] Inventor: Byoung K. Min, Seoul, Rep. of Korea

[73] Assignee: Goldstar Co., Ltd., Seoul, Rep. of Korea

[21] Appl. No.: 241,914

[22] Filed: May 12, 1994

[30] Foreign Application Priority Data

May 14, 1993 [KR] Rep. of Korea .................... 1993-8302

[51] Int. Cl.$^6$ .............................. H04N 7/08; G11B 20/00
[52] U.S. Cl. ......................... 360/61; 348/468; 358/335; 360/33.1
[58] Field of Search ................................. 348/468, 705, 348/706; 358/335; 360/29, 33.1, 61, 62

[56] References Cited

U.S. PATENT DOCUMENTS

| | | | |
|---|---|---|---|
| 5,299,006 | 3/1994 | Kim | 348/571 |
| 5,311,311 | 5/1994 | Harigai et al. | 348/476 |
| 5,347,404 | 9/1994 | Han | 360/19.1 |
| 5,375,160 | 12/1994 | Guidon et al. | 348/468 |

FOREIGN PATENT DOCUMENTS 2263032A 7/1993 United Kingdom .................. 358/335

*Primary Examiner*—Aristotelis Psitos
*Assistant Examiner*—Larry T. Cullen
*Attorney, Agent, or Firm*—Spencer, Frank & Schneider

[57] ABSTRACT

This invention relates to a caption signal recording and reproducing control device of a video cassette recorder which can record and reproduce those caption signals recorded on a tape and transmitted from a broadcasting station, selectively. The device includes a broadcasting signal demodulation part for demodulating broadcasting signals, a first selection switch for selecting one source of signals either from the demodulated signals in the broadcasting signal demodulation part or other input signals, an image processing part having an image recording part and an image reproduction part, a second selection switch for selecting so as to be able to record image signals of the image recording part in recording mode and reproduce image signals recorded on a tape in reproduction mode, a third selection switch for selecting one source of image signals from output signals of the image recording part and the image reproduction part, a fourth selection switch for selecting one source of signals from the image signals of the image reproduction part and the broadcasting signal demodulation part, a caption signal demodulation part for demodulating caption signals of the image signals selected by the fourth selection switch, a first mixer part for mixing the caption signals of the caption signal demodulation part with the image signals of the broadcasting signal demodulation part, and a second mixer part for mixing the caption signals of the caption signal demodulation part with the image signals selected by the third selection switch.

2 Claims, 2 Drawing Sheets

CAPTION SIGNAL RECORDING AND REPRODUCING CONTROL DEVICE IN VIDEO CASSETTE RECORDERS

FIELD OF THE INVENTION

This invention relates to a Video Cassette Recorder (VCR), more particularly to a caption signal recording and reproducing control device of a video cassette recorder which can record and reproduce those caption signals recorded on a tape and transmitted from a broadcasting station, selectively.

BACKGROUND OF THE INVENTION

As shown in FIG. 1, a conventional video cassette recorder which can record and reproduce caption signals includes a broadcasting signal demodulation part 1 for separately demodulating the image signals and the sound signals of broadcasting signals received from a broadcasting station received through an antenna ANT, an image signal selection switch SW1 for selecting one source of image signals from the image signals demodulated in the broadcasting signal demodulation part 1 and external image signals, an image processing part 2 having an image recording part 2A for recording image signals selected by the image signal selection switch SW1 and an image reproduction part 2B for reproducing image signals recorded on a tape, a record reproduction selection switch SW2 for connecting a record reproduction head 3 either to the image recording part 2A at an output terminal thereof to enable the image signals of the image recording part 2A to be recorded on a tape, or to the image reproduction part 2B at an input terminal thereof to enable image signals recorded on the tape to be reproduced, an image output selection switch SW3 for selecting one source of image signals from the image recording part 2A and the image reproduction part 2B, of the image processing part 2, a caption signal demodulation part 4 for demodulating caption signals of the image signals transmitted from the image reproduction part 2B of the image processing part 2, a mixer part 5 for mixing the caption signals transmitted from the caption signal demodulation part 4 with the image signals selected by the image output selection switch SW3, and a control part 6 for controlling operation of various parts of the video cassette recorder.

As shown in FIG. 2, the caption signal demodulation part 4 has a line selection part 4A for selecting a line, for example 21st line loaded with caption data of the transmitted image signals, a caption data sensing part 4B for sensing caption data loaded on a line selected by the line selection part 4A, a control part 4C for reading in a character corresponding to the caption data sensed by the caption data sensing part 4B from a random access memory(RAM) 4D, and a buffer part 4E for buffering tho character signals road in by the control part 4C.

When broadcasting signals of a broadcasting station were transmitted through an antenna ANT, the broadcasting signal demodulation part 1, separating the image signals and the sound signals from the transmitted broadcasting signals, demodulates and applies the separated image signals and the sound signals to the image signal selection switch SW1 at one input terminal thereof.

The image recording part 2A of the image processing part 2 processes either external image signals selected by the image signal selection switch SW1 or the image signals of the broadcasting signal demodulation part 1 and applies them to the record reproduction selection switch SW2 and the image output selection switch SW3 at each of one input terminal thereof.

When the image signals of the image recording part 2A were selected by the record reproduction selection switch SW2, the image signals are recorded by the record reproduction head 3, and when the image signals of the image recording part 2A were selected by the image output selection switch SW3, the image signals are transmitted through the mixer part 5.

On the other hand, when the image signals of the tape reproduced by the record reproduction head 3 were selected by the record reproduction selection switch SW2, the image reproduction part 2B applies the image signals of the tape to the image output selection switch SW3 at one input terminal thereof and the caption signal demodulation part 4.

The caption demodulation part 4, being operated in response to the control signals of the control part, is to be explained referring to FIG. 2.

The line selection part 4A in the caption demodulation part 4 selects a line loaded with the caption data from the applied image signals, for example 21st line, and applies them to the caption sensing part 4B. When the caption sensing part 4B sensed the caption data, the control part reads in a character corresponding to the caption data having two fields in one frame from RAM 4D and applies them to the buffer part 4E. The buffer part, after buffering the corresponding character signals, applies to the mixer part 5.

When the tape image signals of the image reproduction part 2B were selected by the image output selection switch SW3, the tape image signals and the output signals of the caption signal demodulation part 4 are mixed in the mixer part 5.

However, the foregoing conventional video cassette recorder which can record and reproduce caption signals have troubles in that the conventional video cassette recorders can not display or record the caption signals transmitted from a broadcasting station during reproduction of a tape image signals recorded thereon.

SUMMARY OF THE INVENTION

The object of this invention is to provide a caption signal recording and reproducing control device of a video cassette recorder which is provided to have capabilities of displaying or recording caption signals transmitted from a broadcasting station during reproduction operation of the video cassette recorder.

These and other objects and features of this invention can be achieved by providing a device for controlling recording and reproducing of caption signals of a video cassette recorder including a broadcasting signal demodulation part for demodulating broadcasting signals received from a broadcasting station through an antenna, a first selection switch for selecting one source of signals from the demodulated signals in the broadcasting signal demodulation part and other input signals, an image processing part having an image recording part for recording signals selected by the first selecting switch on a tape, and an image reproduction part for reproducing image signals recorded on a tape, a second selection switch for selecting so as to be able to record image signals applied from the image recording part in the image processing part in recording mode and reproduce image signals recorded on a tape in the image reproduction part in reproduction mode, a third selection switch for selecting one source of image signals from output signals of the image recording part and the image reproduction part in the image processing part, a fourth selection switch for selecting one source from signals of the image signals applied from the image reproduction part in the image processing part and the broadcasting signal demodulation part, a caption signal demodulation part for demodulating caption signals of the image signals selected by the fourth selection switch, a first mixer part for mixing the caption signals applied from the caption signal demodulation part with the image signals applied from the broadcasting signal demodulation part and applying the mixed signals to the first selection switch at one input terminal thereof, and a second mixer part for mixing the caption signals of the caption signal demodulation part with the image signals selected by the third selection switch.

DETAILED DESCRIPTION OF THE INVENTION

Figure 3:
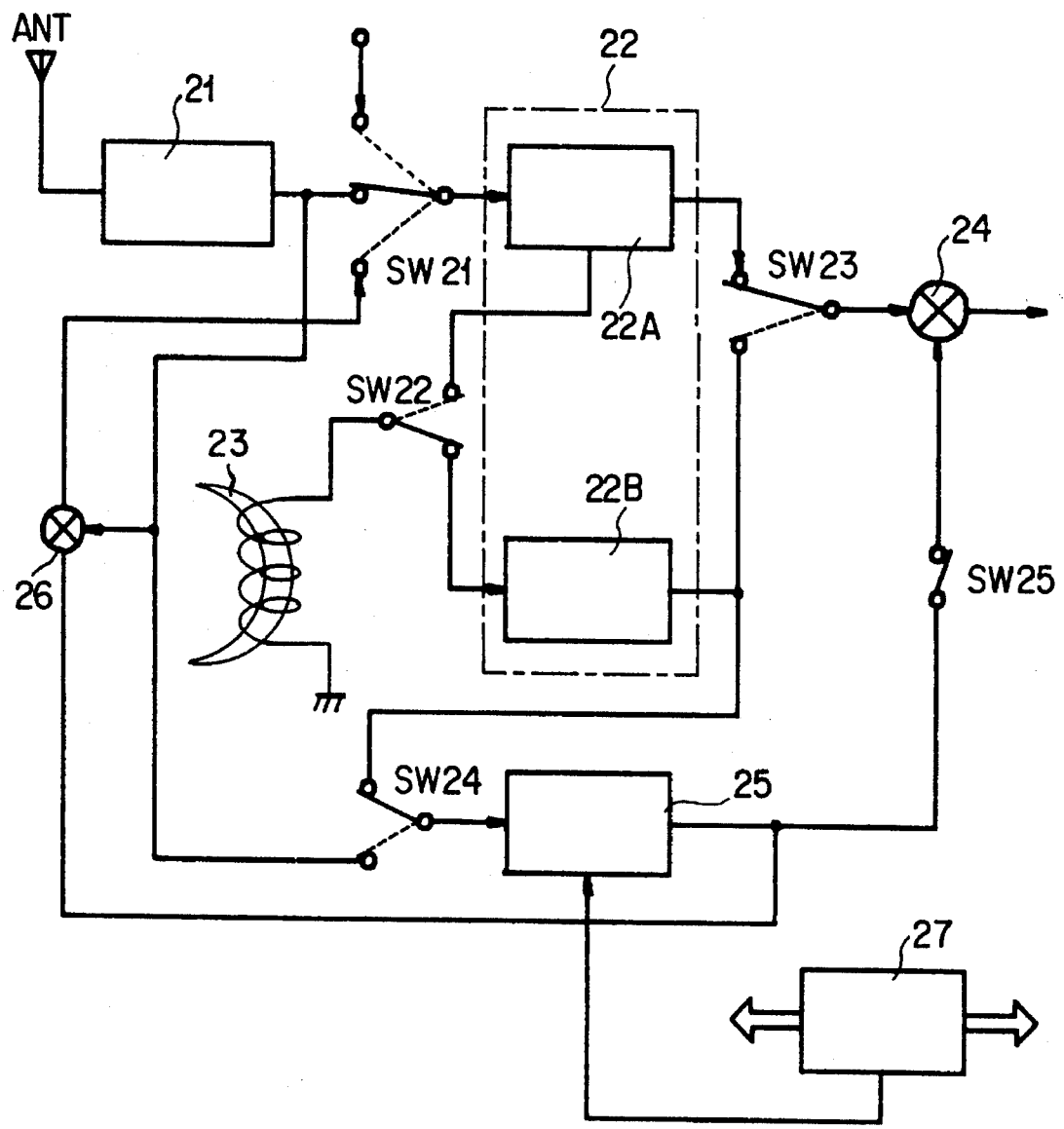
FIG. 3 is a block diagram of a device for controlling recording and reproducing caption signals of a video cassette recorder in accordance with this invention.

Shown in FIG. 3 is a block diagram of a device for controlling recording and reproducing caption signals of a video cassette recorder in accordance with this invention, including a broadcasting signal demodulation part 21 for separating broadcasting signals received from a broadcasting station through an antenna ANT into image signals and sound signals and demodulating the separated image signals, an image signal selection switch SW21 for selecting one source of signals from the demodulated signals in the broadcasting signal demodulation part 21 and other input signals, an image processing part 22 having an image recording part 22A for recording image signals selected by the image signal selecting switch SW21 on a tape, and an image reproduction part 22B for reproducing image signals recorded on a tape, a record reproduction selection switch SW22 for connecting a record reproduction head 23 either to the image recording part 22A at an output terminal thereof enabling to record the image signals applied from the image recording part 22A in the image processing part 22 on a tape through the record reproduction head 23, or to the image reproduction part 22B enabling to reproduce the image signals recorded on a tape, an image output selection switch SW23 for selecting one source of image signals of output signals from the image recording part 22A and the image reproduction part 22B of the image processing part 22, a caption signal selection switch SW24 for selecting one source of signals from the image signals applied from the image reproduction part 22B in the image processing part 22 and the broadcasting signal demodulation part 21, a caption signal demodulation part 25 for demodulating caption signals of the image signals selected by the caption signal selection switch SW24, a mixer part 26 for mixing the caption signals applied from the caption signal demodulation part 25 with the image signals applied from the broadcasting signal demodulation part 21 and applying the mixed signals to the image signal selection switch SW21 at one input terminal thereof, a caption control switch SW25 for supplying and cutting caption signals applied from the caption signal demodulation part 25, a mixer part 25 for mixing the caption signals through the caption control switch SW25 with the image signals selected by the image output selection switch SW23, and a control part 27 for controlling various parts of a video cassette recorder.

When broadcasting signals of a broad casting station were received through an antenna ANT1, the broadcasting signal demodulation part 21 separates the image signals and sound signals from the applied broadcasting signals, demodulates and applies the separated image signals and sound signals to the image selection switch SW21 at one input terminal thereof, the mixer part 26 and the caption selection switch 25 at one input terminal thereof.

When the image selection switch SW21 selected one source of signal from external image signal, the image signal of the broadcasting signal demodulation part 21 and the mixed signal of the mixer part 26, the image recording part 22A, processing the signal selected by the image selection switch SW21, applies to input terminals of the record reproduction switch SW22 and the image output selection switch 23.

When the record reproduction switch SW22 selected the output signals of the image recording part 22A, the record reproduction head 23 records the signals, and when the image output selection switch SW23 selected the output signals of the image recording part 22A, the signals are transmitted through the mixer part 24.

Meantime, when the image signals on a tape reproduced by the record reproduction head 23 were selected by the record reproduction selection switch SW22, the image reproduction part 22B processes the image signals and applies the processed image signals to one of the input terminals of the image output selection switch SW23 and the caption selection switch SW24.

Figure 1:
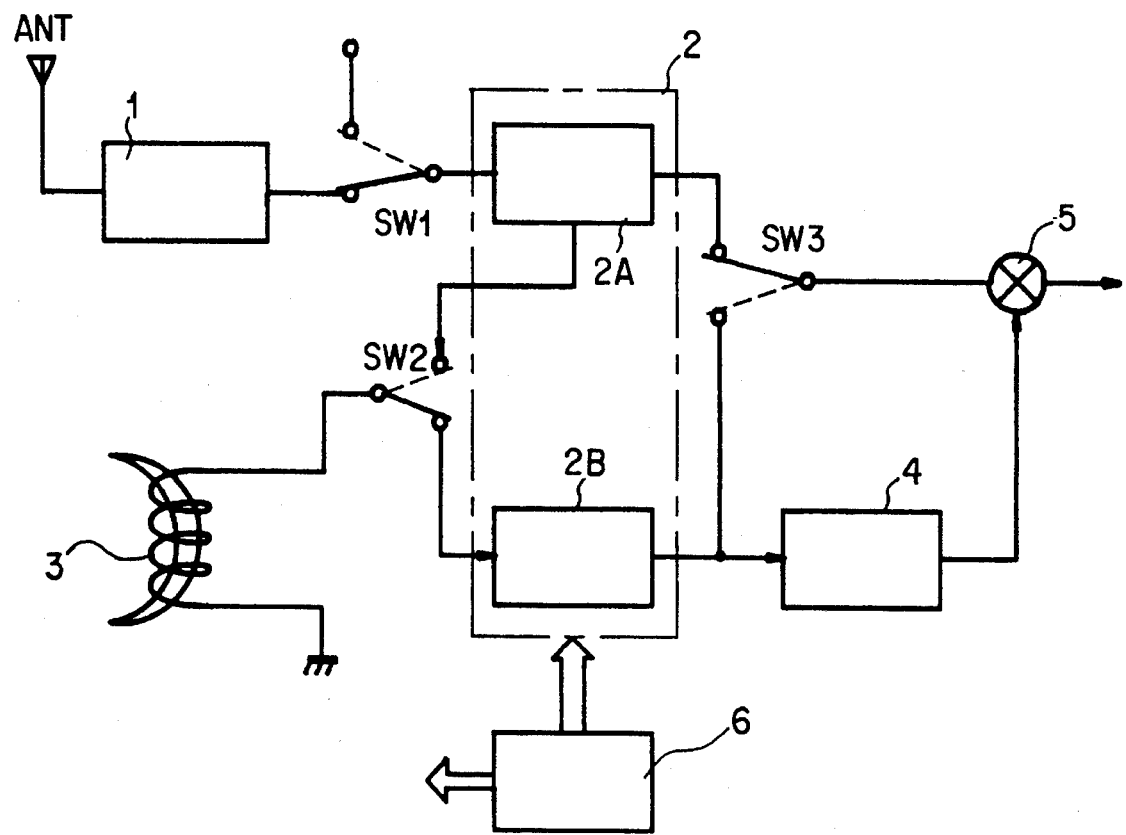
FIG. 1 is a block diagram of a device for controlling recording and reproducing caption signals of a conventional video cassette recorder.
Figure 2:
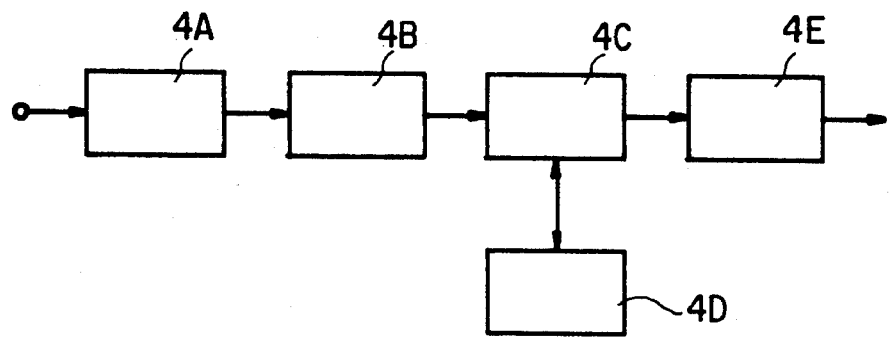
FIG. 2 is a detailed block diagram of a caption demodulation part of FIG. 1.

When the caption selection switch SW24 selected one source of signals from the image signals of the broadcasting signal demodulation part 21 and of a tape of the image reproduction part 24, the caption signal demodulation part 25 demodulates the caption signals of the image signals selected by the caption selection switch SW24 and applies the demodulated caption signals to the mixer part 26 and the caption control switch SW25. The caption signal demodulation part 25 is operated in response to the control signal of the control part 27, as has been explained referring to FIG. 2.

The mixer part 26, mixing the image signal of the broadcasting signal demodulation part 21 with the caption signal, applies the mixed signals to the image selection switch SW21 at one input terminal thereof.

When the caption control switch SW25 selected to supply the caption signals to the caption signal demodulation part 25, the mixer part mixes the caption signals with the signals selected by the image output selection switch SW23 and transmits the mixed signals.

When the image selection switch SW21 selected the mixed signals that the caption signals of the caption signal demodulation part 25 the image signals of the broadcasting signal demodulation part 21 had been mixed by the mixer part 26, the mixed signals can be either recorded on a tape by the record reproduction head 23 through the image recording part 22A and the record reproduction switch SW22, or transmitted through the image recording part 22A, the image output selection switch SW23 and the mixer part 24, finally enabling to watch the caption signals of the broadcasting signals.

As has been explained, by providing selection switches which enables selective reception of the source of caption signals, this invention makes it possible either to watch the caption signals received from a broadcasting station, or record them on a tape during transmission of the caption signals of a tape to a monitor or control of the caption signals of a tape in reproduction operation of a video cassette recorder. Accordingly, there is an advantage of improving reliability of video cassette recorders.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A device for controlling recording and reproducing of caption signals of a video cassette recorder comprising:

a broadcasting signal demodulation part for demodulating broadcasting signals received from a broadcasting station through an antenna;

a first selection switch for selecting one source of signals either from the demodulated signals in the broadcasting signal demodulation part or other input signals;

an image processing part having an image recording part for recording signals selected by the first selecting switch on a tape, and an image reproduction part for reproducing image signals recorded on a tape;

a second selection switch for selecting so as to be able to record image signals transmitted from the image recording part in the image processing part in recording mode and reproduce image signals recorded on a tape in the image reproduction part in reproduction mode;

a third selection switch for selecting one source of image signals from output signals of the image recording part and the image reproduction part in the image processing part;

a fourth selection switch for selecting one source of signals from the image signals applied from the image reproduction part in the image processing part and the broadcasting signal demodulation part;

a caption signal demodulation part for demodulating caption signals of the image signals selected by the fourth selection switch;

a first mixer part for mixing the caption signals applied from the caption signal demodulation part with the image signals applied from the broadcasting signal demodulation part and applying the mixed signals to the first selection switch at one input terminal thereof; and a second mixer part for mixing the caption signals of the caption signal demodulation part with the image signals selected by the third selection switch.

2. The device as claimed in claim 1, further comprising a fifth selection switch which enables to supply or cut the caption signals transmitted from the caption demodulation part to the second mixer part.

* * * * *